US012388820B1

United States Patent
Salim et al.

(10) Patent No.: US 12,388,820 B1
(45) Date of Patent: Aug. 12, 2025

(54) SYSTEMS AND METHODS FOR IDENTIFYING ACTIVITIES OF INDIVIDUALS IN VIRTUAL SPACES USING IDENTITY LINKING

(71) Applicant: Wells Fargo Bank, N.A., San Francisco, CA (US)

(72) Inventors: Sadie S. Salim, Mill Valley, CA (US); Jeff J. Stapleton, O'Fallon, MO (US); Michael Knorr, Fairfield, CT (US); Manesh Saini, New York City, NY (US)

(73) Assignee: Wells Fargo Bank, N.A., San Francisco, CA (US)

( * ) Notice: Subject to any disclaimer, the term of this patent is extended or adjusted under 35 U.S.C. 154(b) by 243 days.

(21) Appl. No.: 17/932,935

(22) Filed: Sep. 16, 2022

(51) Int. Cl.
    *G06F 21/53* (2013.01)
    *H04L 9/40* (2022.01)

(52) U.S. Cl.
    CPC ................ *H04L 63/0876* (2013.01)

(58) Field of Classification Search
    CPC ..................................... H04L 63/0876
    USPC .......................................... 726/4
    See application file for complete search history.

(56) References Cited

U.S. PATENT DOCUMENTS

| | | | |
|---|---|---|---|
| 8,326,853 B2 | 12/2012 | Richard et al. | |
| 10,701,054 B2* | 6/2020 | Padmanabhan | H04L 63/0428 |
| 11,222,298 B2* | 1/2022 | Abelow | G06Q 10/067 |
| 2012/0101970 A1 | 4/2012 | Zernik et al. | |
| 2021/0240729 A1* | 8/2021 | Grant | H04L 67/306 |

OTHER PUBLICATIONS

Xu Wang et al., "Survey on blockchain for Internet of Things" Computer Communications, vol. 136, 2019, pp. 10-29 (20 Pages).
Akash Takyar, "Self-Sovereign Identity in Metaverse", LeewayHertz, 2022, (URL: https://www.leewayhertz.com/metaverse-self-sovereign-identity/), (12 Pages).

* cited by examiner

*Primary Examiner* — Linglan Edwards
*Assistant Examiner* — Phuc Pham
(74) *Attorney, Agent, or Firm* — K&L Gates LLP

(57) ABSTRACT

Systems, apparatuses, methods, and computer program products are disclosed for constructing a foundational identity to establish the identity of an individual and linking the foundational identity to various other identities of the individual in virtual spaces. An example method includes linking identities across virtual spaces. The example method further includes verifying identity activity associated with the various other identities using the link between the various other identities and the foundational identity, and based on the verification of the identity activity, generate outputs.

20 Claims, 4 Drawing Sheets

SYSTEMS AND METHODS FOR IDENTIFYING ACTIVITIES OF INDIVIDUALS IN VIRTUAL SPACES USING IDENTITY LINKING

BACKGROUND

Virtual spaces (e.g., such as the metaverse) are computer-simulated places and/or environments with which users are able to interact via an interface (e.g., a computing device). As individuals spend more time within virtual spaces, these virtual spaces have become a valuable source for user-related information.

BRIEF SUMMARY

An individual can have multiple virtual identities across multiple virtual spaces (e.g., via maintaining one or more accounts and/or profiles across these virtual spaces). While well-established mechanisms for tracing an individual's identity in the real world exist (e.g., associating each individual with a global identification, such as a social security number, assigned to the individual), tracing the same individual within virtual environments (e.g., the virtual spaces) can be more difficult. For example, a link between each of the individual's virtual identities may not always be apparent (or even exist at all). Such difficulties in identifying individuals within virtual spaces present challenges, concerns, and/or other restrictions (e.g., network security concerns, fraud concerns, etc.) for those interacting with the individual within these virtual spaces.

The anonymity provided by virtual spaces (e.g., in virtual spaces such as the metaverse implemented using a decentralized network) may prevent or make it more difficult to identify which identities within these virtual spaces belong to which individual. To address these challenges, each of an individual's identities within these virtual spaces may be linked, directly or indirectly, to one another. This advantageously allows others to more easily identify (and even verify) each of the individual's identities within different virtual spaces. For example, an entity (e.g., a bank, a credit company, a restaurant, etc.) initiating a transaction with the individual may not know that the individual has multiple identities within these virtual spaces. Assume that only one of these identities has been verified and trusted by these entities, any transactions initiated by another of the other unverified identities may cause an issue (e.g., be reported as suspicious activity, be flagged for fraud, be denied, etc.). By establishing a direct or indirect link between all or a portion of these identities, such issues can be easily avoided, which resolves the above-discussed restrictions (i.e., is a direct improvement to technologies implementing mechanisms for enforcing data and/or network security).

Systems, apparatuses, methods, and computer program products are disclosed herein for establishing a link between each of the individual's virtual identities. In some embodiments, the link may be established using a foundational identity instantiated for the individual. The foundational identity of the individual may be a first identity of the individual in a first virtual space and may be used as a starting connection point to link all or a portion of the individual's other identities within other virtual spaces (e.g., as a foundation for the other identities to be layered upon).

Using a combination of direct and indirect linking between the identities may still advantageously allow for anonymity to be maintained between one or more of the individual's identities within the virtual spaces.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

DETAILED DESCRIPTION

Figure 1:
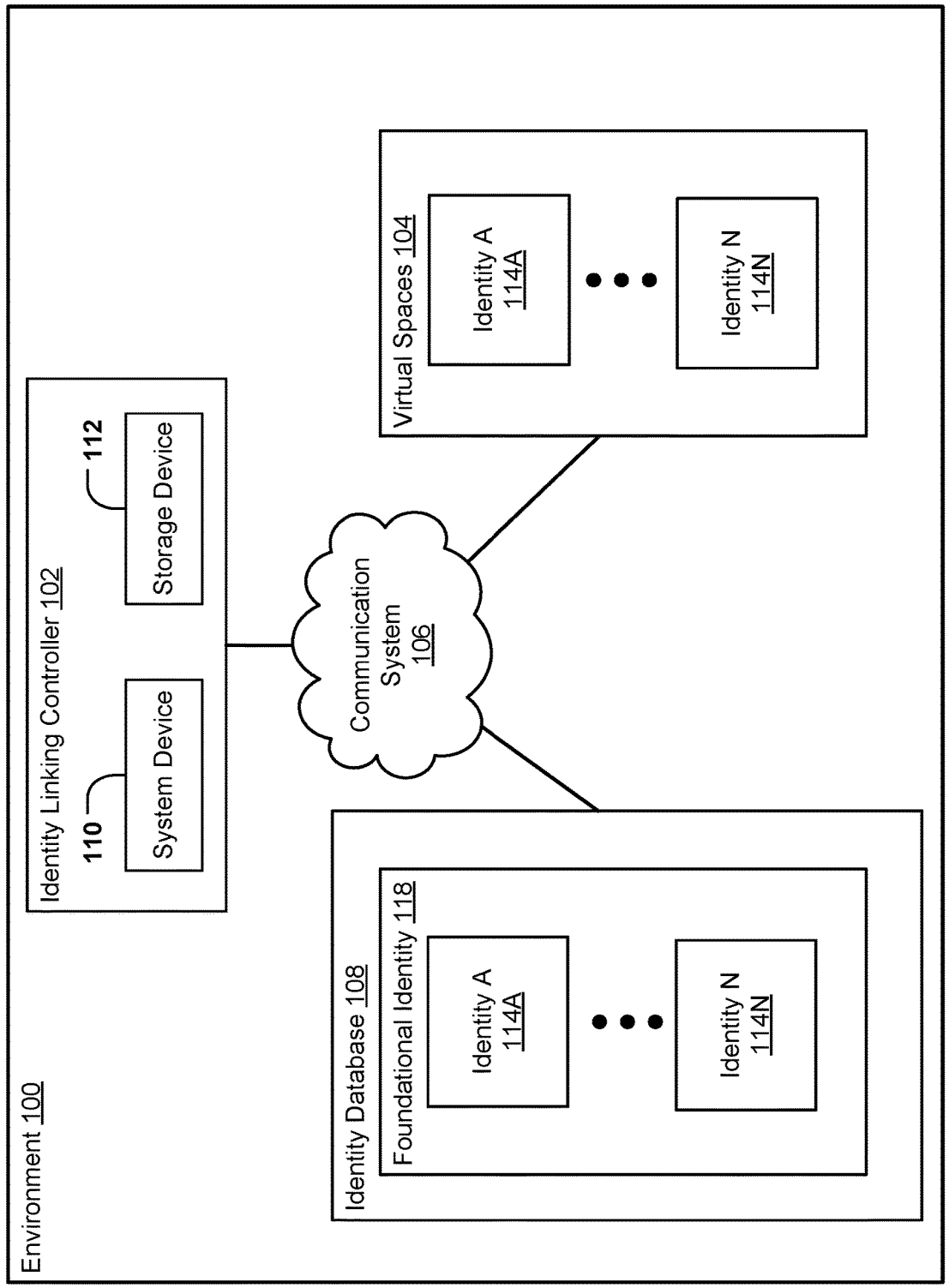
FIG. 1 shows a block diagram illustrating a system in accordance with an embodiment.

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server. A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

Overview

As noted above, methods, apparatuses, systems, and computer program products are described herein that links virtual identities of one or more individuals. Traditionally, the anonymity provided by virtual spaces (e.g., through providing means for anonymized access using aliases, pseudonyms, etc.) prevents and/or makes it difficult (and near impossible) to determine an association (also referred to herein as "association information") between identities created by a single individual in these virtual spaces. Said another way, prior to any links being established between these identities of the individual, the identities lack linking information (e.g., the association information) to associate the plurality of identities to one another. As discussed above, such difficulties present challenges, concerns, and restrictions (e.g., network security concerns, fraud concerns, etc.) for those interacting with said individual within these virtual spaces.

To overcome the restrictions discussed above, in some embodiments, a foundational identity may be established for an individual. A link may then be established between the foundational identity and all or a portion of the individual's created identities in the virtual spaces. For example, the foundational identity of the individual may be a first identity of the individual in a first virtual space and may be used as a starting connection point to link all or a portion of the individual's other identities within other virtual spaces (e.g., as a foundation for the other identities to be layered upon). Using a combination of direct and indirect linking between the identities may still advantageously allow for anonymity to be maintained between one or more of the individual's identities within the virtual spaces.

In some embodiments, once the link is established, the individual's activity associated with the identities may be verified using the link. For example, the individual may have a first identity in a first virtual space and a second identity in a second virtual space. The first identity may be used as the foundational identity and may already be known (and trusted) by one or more entities (e.g., a bank, a credit company, a restaurant, etc.) interacting with the individual to complete one or more actions (also referred to as "identity activity") within the virtual spaces (e.g., a digital transaction of goods or services with monetary value, etc.). The link between the first identity (as the foundational identity) with the second identity would cause the second identity to be afforded with the same level of trust (to the entities) as the first identity such that the second identity can also be used to complete (e.g., allow or deny execution of) said interactions between the individual and the one or more entities.

As another example of embodiments described herein, the individual may have a third identity in addition to the above first and second identities. The first identity may still be the foundational identity and has a direct link with the second identity. The second identity may then be directly linked to the third identity, and no direct links may exist between the third identity and the first identity (e.g., the third identity is indirectly linked to the foundational identity through the second identity). Such linkage not only advantageously allows the third identity to also be (indirectly) afforded with the same level of trust (to the entities) as the first and second identities, but also advantageously allows the third identity to be anonymous to the first identity. Said another way, without a direct link between the first identity and the third identity, the first identity will not have access to any information of the third identity.

In some embodiments, a single foundational identity may be dedicated to a single individual. Alternatively, a single foundational identity may be used for multiple different individuals. For example, the first individual may be a child with a first identity in a virtual space and the second individual may be the child's guardian (e.g., parents, grandparents, etc.) with a second identity in the same (or different) virtual space. The guardian's identity may set as the foundational identity and the child's identity may be linked (directly or indirectly) to this foundational identity. Such linking may advantageously provide the child with a trust level associated with the child's guardian. For example, the child is given the guardian's payment information (e.g., credit card information) and the child uses the payment information to interact (i.e., make a transaction) with an entity operating in that virtual space. Such linking can then allow the entity to determine that the child is associated with the guardian who may be a verified and trusted client of the entity such that the entity can allow completion of the interaction.

Although a high-level explanation of the operations of example embodiments has been provided above, specific details regarding the configuration of such example embodiments are provided below.

System Architecture

Example embodiments described herein may be implemented using any of a variety of computing devices or servers. To this end, FIG. 1 illustrates an example environment 100 within which various embodiments may operate. As illustrated, an identity linking controller 102 may include a system device 110 in communication with a storage device 112. Although system device 110 and storage device 112 are described in singular form, some embodiments may utilize more than one system device 110 and/or more than one storage device 112. Additionally, some embodiments of the identity linking controller 102 may not require a storage device 112 at all. Whatever the implementation, the identity linking controller 102, and its constituent system device(s) 110 and/or storage device(s) 112 may receive and/or transmit information via communication system 106 (e.g., the Internet) with any number of other devices, such as one or more of identity A 114A, through identity N 114N of foundational identity 118 included in an identity database 108, and/or identity A 114A, through identity N 114N of virtual spaces 104.

System device 110 may be implemented as one or more servers, which may or may not be physically proximate to other components of identity linking controller 102. Furthermore, some components of system device 110 may be physically proximate to the other components of identity linking controller 102 while other components are not. System device 110 may receive, process, generate, and transmit data, signals, and electronic information to facilitate the operations of the identity linking controller 102. Components of system device 110 are described in greater detail below with reference to apparatus 200 in connection with FIG. 2.

Storage device 112 may comprise a distinct component from system device 110 or may comprise an element of system device 110 (e.g., memory 204, as described below in connection with FIG. 2). Storage device 112 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communication system 106). Storage device 112 may host the software executed to operate the identity linking controller 102. Storage device 112 may store information relied upon during operation of the identity linking controller 102, such as various databases that may be used by the identity linking controller 102, data and documents to be analyzed using the identity linking controller 102, or the like. In addition, storage device 112 may store control signals, device characteristics, and access credentials enabling interaction between the identity linking controller 102 and one or more of identity 114A-114N of foundational identity 118 included in identity database 108, and/or identity 114A-114N of virtual spaces 104.

The identity database 108 may be a storage component hosted on one or more computing devices connected to the identity linking controller 102 using communication system 106. Like the storage device 112, the identity database 108 may be a storage component such as one or more direct-attached storage (DAS) devices (such as hard drives, solid-state drives, optical disc drives, or the like) or may alternatively comprise one or more Network Attached Storage (NAS) devices independently connected to a communications network (e.g., communication system 106). In some embodiments, the identity database 108 may be configured to store (e.g., in the form of one or more data structures such as a table, a file, etc.) a foundational identity 118. The foundational identity 118 may specify (i.e., include) information associated with a plurality of identities 114A-114N of one or more individuals. Although only a single identity database 108 is shown in FIG. 1, a person having ordinary skill in the art would appreciate that the system of FIG. 1 can includes any number of identity databases 108. Each of these identity databases 108 may store one or multiple of the foundational identity 118. In some embodiments, the identity database 108 may be included in the identity linking controller as part of the storage device 112.

The virtual spaces 104 may be a space created within a virtual environment (e.g., the metaverse, a website, an online video game, etc.). The virtual spaces 104 may each store one or more identities 114A-114N created by one or more individuals. For example, assume that the virtual space is an online video game. Users of the online video game may each create one or more identities 114A-114N (e.g., in the form of avatars) within the online video game environment. These identities 114A-114N are stored by computing devices (e.g., servers) hosting the online video game.

Although FIG. 1 illustrates an environment and implementation in which the identity linking controller 102 interacts with the virtual spaces 104 to store (via linking) one or more of the identities 114A-114N of the virtual spaces 104 as the identities 114A-114N shown in the foundational identity 118. In some embodiments users may directly interact with the identity linking controller 102 (e.g., via input/output circuitry of system device 110). Alternatively, users may indirectly interact with the identity linking controller 102 using any separate computing devices (not shown) that are connected to the identity linking controller 102 via the communication system 106. Whether by way of direct interaction or via separate computing devices, a user may communicate with, operate, control, modify, or otherwise interact with the identity linking controller 102 to perform the various functions and achieve the various benefits described herein.

Example Implementing Apparatuses

Figure 2:
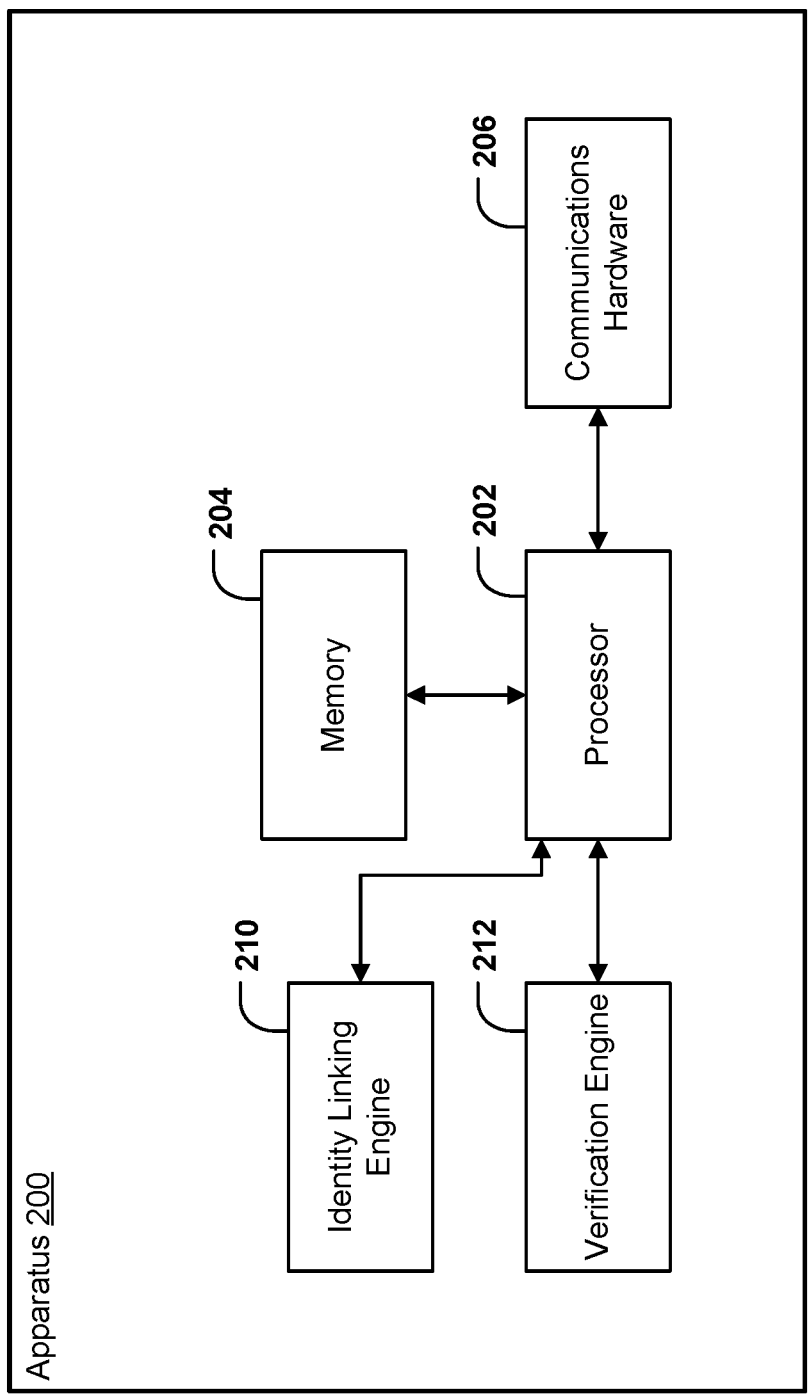
FIG. 2 illustrates a schematic block diagram of example circuitry embodying a device that may perform various operations in accordance with some example embodiments described herein.

System device 110 of the identity linking controller 102 (described previously with reference to FIG. 1) may be embodied by one or more computing devices or servers, shown as apparatus 200 in FIG. 2. As illustrated in FIG. 2, the apparatus 200 may include processor 202, memory 204, communications hardware 206, input-output circuitry of communications hardware 206, identity linking engine 210, and verification engine 212, each of which will be described in greater detail below. While the various components are only illustrated in FIG. 2 as being connected with processor 202, it will be understood that the apparatus 200 may further comprises a bus (not expressly shown in FIG. 2) for passing information amongst any combination of the various components of the apparatus 200. The apparatus 200 may be configured to execute various operations described above in connection with FIG. 1 and below in connection with FIGS. 3-4.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor (e.g., software instructions stored on a separate storage device 112, as illustrated in FIG. 1). In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications hardware 206 may be any means such as a device or circuitry embodied in either hardware or a combination of hardware and software that is configured to receive and/or transmit data from/to a network and/or any other device, circuitry, or module in communication with the apparatus 200. In this regard, the communications hardware 206 may include, for example, a network interface for enabling communications with a wired or wireless communication network. For example, the communications hardware 206 may include one or more network interface cards, antennas, buses, switches, routers, modems, and supporting hardware and/or software, or any other device suitable for enabling communications via a network. Furthermore, the communications hardware 206 may include the processor for causing transmission of such signals to a network or for handling receipt of signals received from a network. In some embodiments, the communications hardware 206 may include, for example, interfaces such as one or more ports (e.g., a laser port, a fiber-optic cable port, and/or the like) for enabling communications with other devices.

The communications hardware 206 may include input-output circuitry (not shown) configured to provide output to a user and, in some embodiments, to receive an indication of user input. It will be noted that some embodiments will not include input-output circuitry, in which case user input may be received via a separate device such as a separate client device or the like. The input-output circuitry of the communications hardware 206 may comprise a user interface, such as a display, and may further comprise the components that govern use of the user interface, such as a web browser, mobile application, dedicated client device, or the like. In some embodiments, the input-output circuitry may include a keyboard, a mouse, a touch screen, touch areas, soft keys, a microphone, a speaker, and/or other input/output mechanisms. The input-output circuitry may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises a identity linking engine 210 configured to link (directly and/or indirectly) a plurality of identities to a foundational identity such that each identity of the plurality of identities is associated to one another using the foundational identity. Prior to linking, each identity of the plurality of identities lacks linking information to associate the plurality of identities to one another. The identity linking engine 210 may utilize processor 202, memory 204, or any other hardware component included in the apparatus 200 to perform these operations, as described in connection with FIGS. 3-4 below. The identity linking engine 210 may further utilize communications hardware 206 to gather data from a variety of sources (e.g., identity 114A through identity 114N of virtual spaces 104 or storage device 112, as shown in FIG. 1), may utilize input-output circuitry of communications hardware 206 to receive data from a user, and in some embodiments may utilize processor 202 and/or memory 204 to link the plurality of identities to the foundational identity.

Finally, the apparatus 200 further comprises a verification engine 212 configured to verify identity activity of the plurality of identities using the link between the plurality of identities from the foundational identity. The verification engine 212 may also be configured to generate an output specifying a result of the verification of the identity activity. The verification engine 212 may utilize processor 202, memory 204, or any other hardware component included in the apparatus 200 to perform these operations, as described in connection with FIGS. 3-4 below. The verification engine 212 may further utilize communications hardware 206 to gather data from a variety of sources (e.g., identity 114A through identity 114N of virtual spaces 104 or storage device 112, as shown in FIG. 1), may utilize input-output circuitry of communications hardware 206 to receive data from a user, and in some embodiments may utilize processor 202 and/or memory 204 to verify identity activity and generate an output based on the verification of the identity activity.

Although components 202-212 are described in part using functional language, it will be understood that the particular implementations necessarily include the use of particular hardware. It should also be understood that certain of these components 202-212 may include similar or common hardware. For example, the identity linking engine 210 and verification engine 212 may each at times leverage use of the processor 202, memory 204, communications hardware 206, or input-output circuitry of communications hardware 206, such that duplicate hardware is not required to facilitate operation of these physical elements of the apparatus 200 (although dedicated hardware elements may be used for any of these components in some embodiments, such as those in which enhanced parallelism may be desired). Use of the terms "circuitry," and "engine" with respect to elements of the apparatus therefore shall be interpreted as necessarily including the particular hardware configured to perform the functions associated with the particular element being described. Of course, while the terms "circuitry" and "engine" should be understood broadly to include hardware, in some embodiments, the terms "circuitry" and "engine" may in addition refer to software instructions that configure the hardware components of the apparatus 200 to perform the various functions described herein.

Although the identity linking engine 210 and verification engine 212 may leverage processor 202, memory 204, communications hardware 206, or input-output circuitry of communications hardware 206 as described above, it will be understood that any of these elements of apparatus 200 may include one or more dedicated processor, specially configured field programmable gate array (FPGA), or application specific interface circuit (ASIC) to perform its corresponding functions, and may accordingly leverage processor 202 executing software stored in a memory (e.g., memory 204), or memory 204, communications hardware 206 or input-output circuitry of communications hardware 206 for enabling any functions not performed by special-purpose hardware elements. In all embodiments, however, it will be understood that the identity linking engine 210 and verification engine 212 are implemented via particular machinery designed for performing the functions described herein in connection with such elements of apparatus 200.

In some embodiments, various components of the apparatuses 200 may be hosted remotely (e.g., by one or more cloud servers) and thus need not physically reside on the corresponding apparatus 200. Thus, some or all the functionality described herein may be provided by third party circuitry. For example, a given apparatus 200 may access one or more third party circuitries via any sort of networked connection that facilitates transmission of data and electronic information between the apparatus 200 and the third-party circuitries. In turn, that apparatus 200 may be in remote communication with one or more of the other components describe above as comprising the apparatus 200.

As will be appreciated based on this disclosure, example embodiments contemplated herein may be implemented by an apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Having described specific components of example apparatuses 200, example embodiments are described below in connection with a series of flowcharts.

Example Operations

Figure 3:
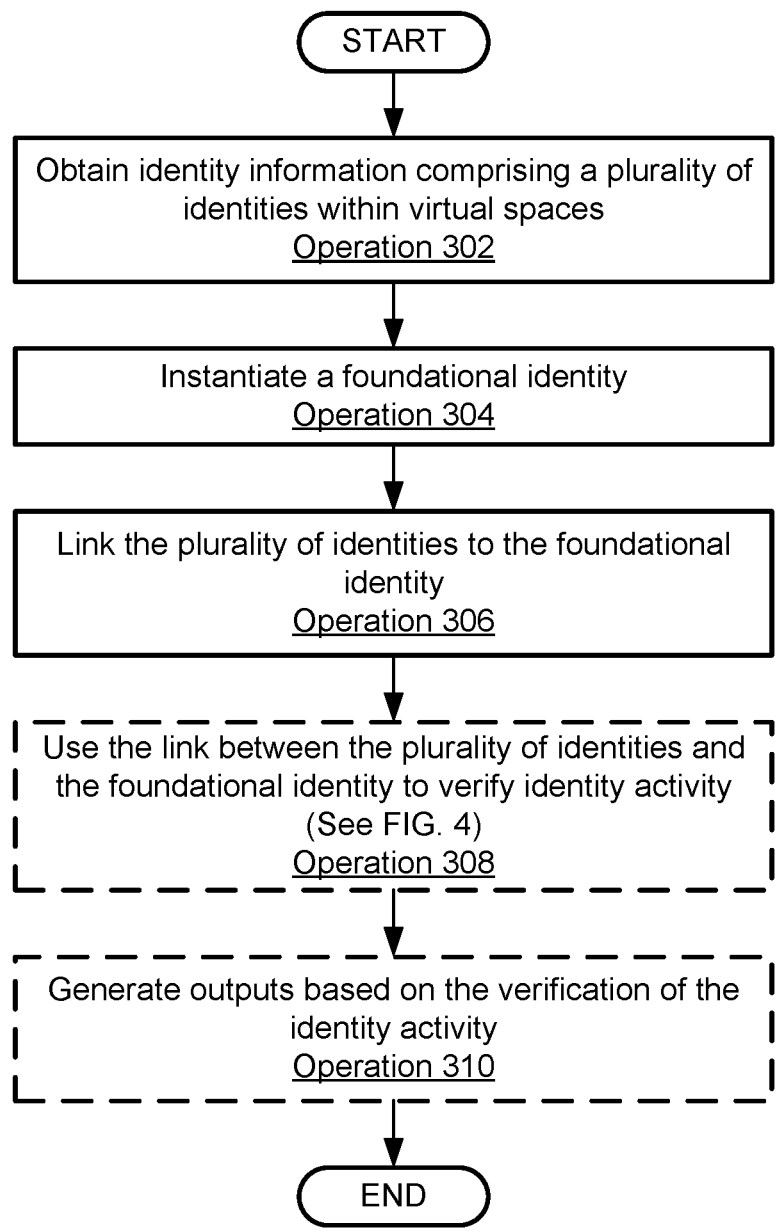
FIG. 3 illustrates an example flowchart for linking identities across virtual spaces, in accordance with some example embodiments described herein.
Figure 4:
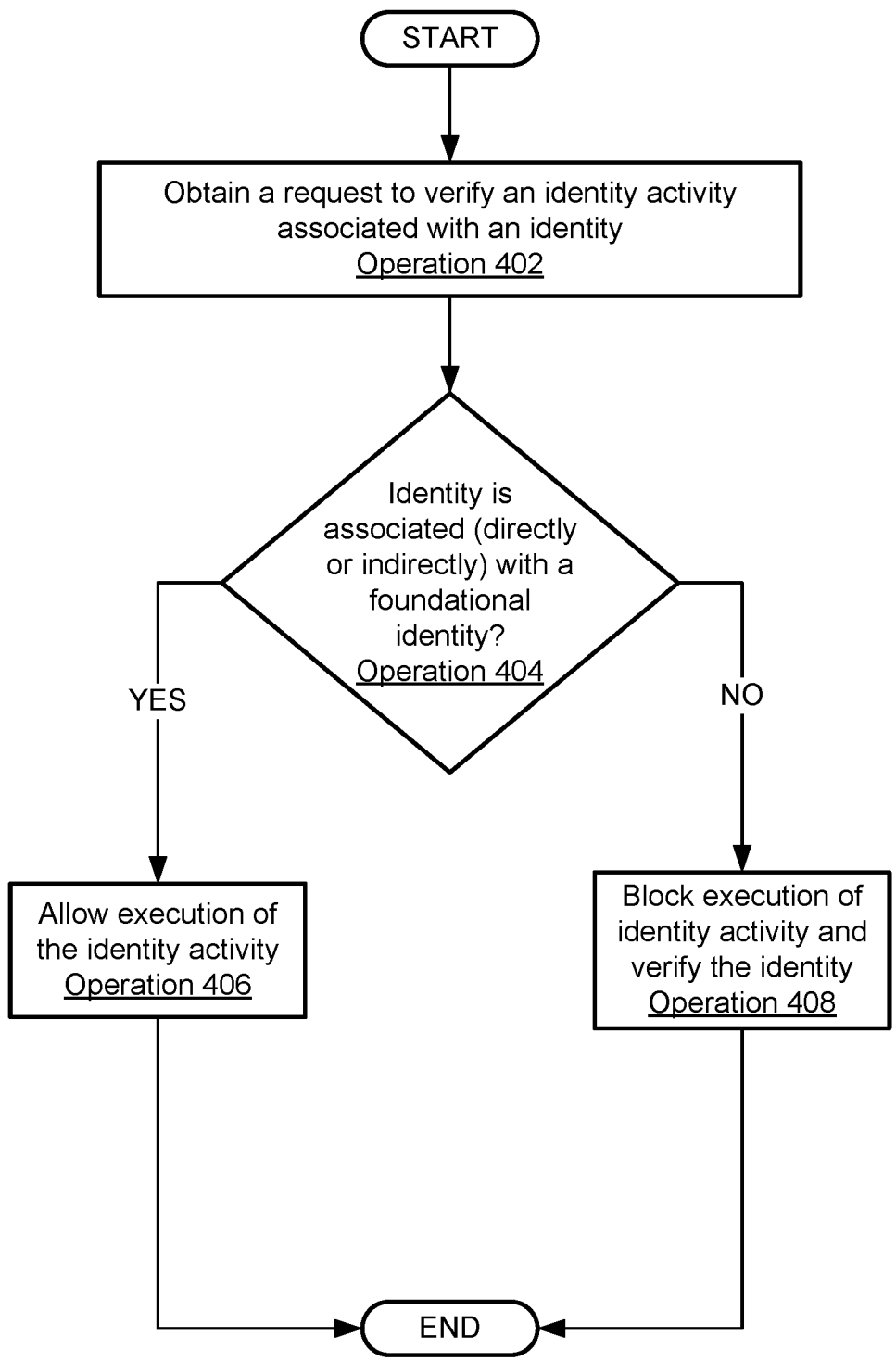
FIG. 4 illustrates an example flowchart for verifying identity activity, in accordance with some example embodiments described herein.

Turning to FIGS. 3 and 4, example flowcharts are illustrated that contain example operations implemented by example embodiments described herein. The operations illustrated in FIGS. 3 and 4 may, for example, be performed by system device 110 of the identity linking controller apparatus 102 shown in FIG. 1 which may in turn be embodied by an apparatus 200, which is shown and described in connection with FIG. 2. To perform the operations described below, the apparatus 200 may utilize one or more of processor 202, memory 204, communications hardware 206, input-output circuitry of communications hardware 206, identity linking engine 210, verification engine 212, and/or any combination thereof. It will be understood that user interaction with the identity linking controller 102 may occur directly via input-output circuitry of communications hardware 206, or may instead be facilitated by a separate entity, not expressly shown in FIG. 1, and which may have similar or equivalent physical componentry facilitating such user interaction.

Turning first to FIG. 3, example operations are shown for linking virtual identities of one or more individuals across virtual spaces.

As shown by operation 302, the apparatus 200 includes means, such as communications hardware 206, identity linking engine 210, or the like, for obtaining identity information comprising a plurality of identities within virtual spaces. Identity information may be obtained from a user self-reporting (e.g., using one or more of the input-output circuitry of the communications hardware 206) one or more of the user's identities within virtual space(s). The user may have a single or multiple identities in each virtual space. Each of the user's identities may be embodied by one or more of: (i) a digital avatar, (ii) a profile image, (iii) an email address, (iv) a username, and/or any other unique identifier used to identify the user within some virtual space. Once received by the communications hardware 206, the communications hardware 206 provides the self-reported identities to the identity linking engine 210.

As shown by operation 304, the apparatus 200 includes means, such as identity linking engine 210, or the like, for instantiating a foundational identity. The foundational identity may be selected by the identity linking engine 210 from among any of the self-reported identities obtained in operation 302. The identity selected as the foundational identity may be provided with a foundational identity identifier (foundational identity ID) (by the identity linking engine 210) to establish and identity it as the foundational identity. The foundational identity ID may be made up of any combination of characters, numbers, and symbols. Alternatively, the foundational identity ID may be made up of (e.g., based on) biometric data of the users. Said another way, a user's fingerprint, retina scan, Deoxyribonucleic Acid (DNA) sequence, or the like may be obtained and used as the foundational identity ID. As yet another example, the foundational identity ID may be embodied by: (i) a non-fungible tokens (NFTs), (ii) a graphic, or the like.

In embodiments, once generated, the foundation identity ID stored in a database (e.g., identity database 108) by the identity linking engine 210. For example, consider a client of a bank self-reporting three identities that exist in three different virtual spaces. The bank may then obtain data about the client (e.g., biometric data given by the client at a physical site), hash the data, and use the hashed data as the foundational identity ID to link one of the three identities selected as the foundational identity to the other two identities. The bank may then store the foundational identity and the foundational identity ID in a database (e.g., identity database 108) managed by the bank.

As shown by operation 306, the apparatus 200 includes means, such as identity linking engine 210, or the like, for linking the plurality of identities to the foundational identity. Linking the plurality of identities to the foundational identity may be performed by making a record of each identity of the plurality of identities, storing the record in the database (e.g., identity database 108), associating the foundational identity (directly or indirectly) to each identity of the plurality of identities using the foundation identity ID, and storing the respective association information alongside each respective identity of the plurality of identities.

In some embodiments, the association (e.g., link) between two identities may be direct. For example, continuing with the above example of the client who self-reported the three identities (identity A, identity B, identity C), assume that identity A is selected as the foundational identity. A direct link may be established between the foundational identity (identity A) with any of the other two identities (e.g., B↔A↔C). In some embodiments, the association (e.g., link) between two identities may be indirect. For example, continuing with the above example of the client who self-reported the three identities, assume that identity A is still selected as the foundational identity, an indirect link may be established between the foundational identity (identity A) with identity C through identity B (e.g., A↔B↔C). Such indirect or direct linking of identities may be determined by the user self-reporting the identities, by the entity that the identities are self-reported to, by one or more rules preset in the identity linking engine, or the like.

As shown by operation 308 (marked with broken lines in FIG. 3 to indicate that this operation may be optional), the apparatus 200 includes means, such as verification engine 212, or the like, for using the link between the plurality of identities and the foundational identity to verify identity activity (to be discussed further below with respect to FIG. 4) of one or more individuals (also referred to herein as "user") within virtual spaces.

More specifically, turning to FIG. 4, example operations are shown for using the link between the plurality of identities and the foundational identity to verify an individual's identity activity within virtual spaces.

As shown by operation 402, the apparatus 200 includes means, such as verification engine 212, or the like, for obtaining a request to verify identity activity associated with an identity. The request may be instantiated as actions are taken by one or more identities of the plurality of identities in virtual space. The request may comprise the identity activity and associated identity in question. For example, continuing with the above example of the client who self-reported the three identities (identity A, identity B, identity C) where identity A is selected as the foundational identity, assume that the client has another identity (identity D) that was not self-reported. Further assume that the client executed (in different virtual spaces) two transactions (i.e., actions) respectively involving identity C and identity D and a same payment card of the client. The execution of the transactions may trigger a verification request to be sent to the verification engine 212 through the communications hardware 206.

As shown by operation 404, the apparatus 200 includes means, such as verification engine 212, or the like, for making a determination regarding whether the identity in question identified in operation 402 is associated (directly or indirectly) with a foundational identity. More specifically, in embodiments, the verification engine 212 may parse (e.g., search through) a database (e.g., identity database 108) to determine whether the identity in question is associated with a foundational identity.

In response to the verification engine 212 determining that the identity in question is associated with a foundational identity (i.e., YES in operation 404), the method may proceed to operation 406.

In particular, as shown by operation 406, the apparatus 200 includes means, such as verification engine 212, or the like, for allowing execution of the identity activity identified in operation 402. For example, continuing with the above example of the client who self-reported the three identities (identity A, identity B, identity C) where identity A is selected as the foundational identity to (directly or indirectly) link the other two identities, verification engine 212 determines that identity C involved in one of the two transactions is link (directly or indirectly) to the foundational identity. In response to this determination, the verification engine 212 may transmit (using communications hardware 206), to one or more computing devices processing the transaction (and/or the virtual space hosting identity C), a notification or instruction to allow the transaction. Namely, identity C has been verified as being linked to the foundational identity and as a result afforded with the same level trust afforded to the foundational identity.

Alternatively, in response to the verification engine 212 determining that the identity in question is not associated with a foundational identity (i.e., NO in operation 404), the method may proceed to operation 408.

As shown by operation 408, the apparatus 200 includes means, such as verification engine 212, or the like, for blocking execution of identity activity identified in operation 402. The verification engine 212 may also transmit instructions for causing a computing device (e.g., the computing device processing the transaction, the computing device hosting the virtual space, etc.) to verify the identity associated with the identity activity identified in operation 402. For example, continuing with the above example of the client who self-reported the three identities (identity A, identity B, identity C) where identity A is selected as the foundational identity to (directly or indirectly) link the other two identities, verification engine 212 determines that identity D involved in the other one of the two transactions is not linked at all to the foundational identity. In response to this determination, the verification engine 212 may transmit (using communications hardware 206), to one or more computing devices processing the transaction (and/or the virtual space hosting identity D), a notification or instruction to block the transaction and verify identity D. Namely, identity D having no link to the foundational identity is not afforded with the same level of trust afforded to the foundational identity as with identity C and therefore requires additional verification before the transaction can be completed using the client's payment card.

Returning to FIG. 3, as shown by operation 310 (marked with broken lines in FIG. 3 to indicate that this operation may be optional), the apparatus 200 includes means, such as communications hardware 206, verification engine 212, or the like, for generating outputs based on the verification of the identity activity. More specifically, the verification engine 212 may generate an output including the results of operation 406 (i.e., the allowing of the transaction) and/or the results of operation 408 (i.e., the blocking of the transaction and the requiring of further verification). The verification engine 212 may then provide the generated output to the communications hardware 206 such that the output is transmitting (by the communications hardware 206) to the above-discussed computing device(s) processing the action related to the identity activity identified in operation 402.

As described above, example embodiments provide methods and apparatuses that enable improved tracing of activities of individuals as the individuals traverse through virtual spaces. Example embodiments thus provide tools that overcome the problems and restrictions associated with tracing one or more individuals' activities in virtual spaces, while also advantageously being able to maintain the individuals' anonymity within the virtual spaces, and thus establishing security for the individuals (and entities processing one or more actions by the individuals in the virtual spaces) as the individuals traverse through virtual spaces. Finally, by automating functionality that has historically required human analysis, the speed and consistency of the tracing of activities in virtual spaces performed by example embodiments unlocks many potential new functions that have historically not been available, such as the ability to conduct near-real-time dispute resolution when activities in the virtual spaces may be questioned.

As these examples all illustrate, example embodiments contemplated herein provide technical solutions that solve real-world problems faced during the existence of various identities in various virtual spaces. And while tracing an individual's activities in the virtual realm has been an issue, the recently exploding amount of functions (e.g., anonymity afforded in decentralized networks) made available by recently emerging technology (e.g., the metaverse) today has made this problem significantly more acute, as the demand for activity tracing and transparency to verify actions by individuals in the virtual spaces has grown significantly. Example embodiments described herein thus represent a technical solution to these real-world problems of activities in such virtual spaces.

FIGS. 3 and 4 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a computer-readable memory that may direct a computing device or other programmable apparatus to function in a particular manner, such that the software instructions stored in the computer-readable memory produce an article of manufacture, the execution of which implements the functions specified in the flowchart blocks. The software instructions may also be loaded onto a computing device or other programmable apparatus to cause a series of operations to be performed on the computing device or other programmable apparatus to produce a computer-implemented process such that the software instructions executed on the computing device or other programmable apparatus provide operations for implementing the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

In some embodiments, some of the operations above may be modified or further amplified. Furthermore, in some embodiments, additional optional operations may be included. Modifications, amplifications, or additions to the operations above may be performed in any order and in any combination.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for linking identities across a plurality of virtual spaces, the method comprising:
    obtaining, by communication hardware, identity information, wherein the identity information comprises a plurality of identities within the plurality of virtual spaces and wherein at least one of the identities is a first self-reported identity;
    generating, by an identity linking engine, a foundational identity comprising the first self-reported identity, wherein the first self-reported identity may be automatically chosen from a plurality of self-reported identities;
    generating, by the identity linking engine, a foundational identity identifier comprising at least one of:
        (i) a string comprising numbers, letters, and symbols,
        (ii) a set of biometric data corresponding to a user associated with the foundational identity,
        (iii) a non-fungible token, and
        (iv) an image;
    linking, by the identity linking engine, the plurality of identities to the foundational identity such that identities in the plurality of virtual spaces are associated to one another through the foundational identity identifier, wherein, prior to the linking, the identities lack linking information that associates the identities to one another, wherein linking the plurality of identities comprises, for each identity of the plurality of identities:
        recording the identity,
        creating association data associating the foundational identity to the identity, and
        storing the association data together with a representation of the identity;
    verifying, by a verification engine, identity activity associated with the plurality of identities using links between each of the plurality of identities and the foundational identity; and
    generating, by the verification engine, an output specifying a result of a verification of the identity activity.

2. The method of claim 1, wherein verifying the identity activity comprises:
    obtaining, by the verification engine, a first request to verify first identity activity associated with a second identity among the plurality of identities;
    determining, by the verification engine, that the second identity is associated with the foundational identity; and
    in response to determining that the second identity is associated to the foundational identity, by the verification engine, allowing execution of the first identity activity.

3. The method of claim 2, wherein the second identity is directly associated with the foundational identity.

4. The method of claim 2, wherein the second identity is indirectly associated with the foundational identity through a third identity among the plurality of identities.

5. The method of claim 2, wherein verifying the identity activity further comprises:
    obtaining, by the verification engine, a second request to verify second identity activity associated with a third identity among the plurality of identities;
    determining, by the verification engine, that the third identity is not associated with the foundational identity; and
    in response to determining that the third identity is not associated to the foundational identity, by the verification engine, blocking execution of the second identity activity.

6. The method of claim 1, wherein the foundational identity is a unique identifier associated with one or more individuals.

7. The method of claim 1, wherein the plurality of identities, which are associated with the plurality of virtual spaces, comprises:
    a second identity associated with a first virtual space; and
    a third identity associated with a second virtual space different from the first virtual space.

8. The method of claim 7, wherein the first self-reported identity and the second identity are associated with a same individual.

9. The method of claim 7, wherein the first self-reported identity and the second identity are associated with different individuals.

10. The method of claim 1, wherein each of the plurality of identities is a digital avatar in a virtual space of the plurality of virtual spaces.

11. The method of claim 1 wherein the output specifying the result of the verification of the identity activity comprises an instruction output which causes execution of the identity activity to be blocked.

12. An apparatus for linking identities across a plurality of virtual spaces, the apparatus comprising:
  communication hardware configured to obtain identity information, wherein the identity information comprises a plurality of identities within the plurality of virtual spaces and wherein at least one of the identities is a first self-reported identity;
  an identity linking engine configured to:
    generate a foundational identity comprising the first self-reported identity, wherein the first self-reported identity may be automatically chosen from a plurality of self-reported identities,
    generate a foundational identity identifier comprising at least one of:
      (i) a string comprising numbers, letters, and symbols;
      (ii) a set of biometric data corresponding to a user associated with the foundational identity;
      (iii) a non-fungible token; and
      (iv) an image; and
    link the plurality of identities to the foundational identity, such that identities in the plurality of virtual spaces are associated to one another through the foundational identity identifier, wherein, prior to the linking, the identities lack linking information that associates the identities to one another, wherein the identity linking engine is further configured so that linking the plurality of identities comprises, for each identity of the plurality of identities;
    recording the identity,
    creating association data associating the foundational identity to the identity, and
    storing the association data together with a representation of the identity; and
  a verification engine configured to:
    verify identity activity associated with the plurality of identities using links between each of the plurality of identities and the foundational identity, and
    generate an output specifying a result of the verification of the identity activity.

13. The apparatus of claim 12, wherein the verification engine is further configured to:
  obtain a first request to verify first identity activity associated with a second identity among the plurality of identities;
  determine that the second identity is associated with the foundational identity; and
  in response to determining that the second identity is associated to the foundational identity, allowing execution of the first identity activity.

14. The apparatus of claim 13, wherein the second identity is directly associated with the foundational identity.

15. The apparatus of claim 13, wherein the second identity is indirectly associated with the foundational identity through a third identity among the plurality of identities.

16. The apparatus of claim 13, wherein the verification engine is further configured to:
  obtain a second request to verify second identity activity associated with a third identity among the plurality of identities;
  determine that the third identity is not associated with the foundational identity; and
  in response to determining that the second identity is not associated to the foundational identity, blocking execution of the second identity activity.

17. A computer program product for linking identities across a plurality of virtual spaces, the computer program product comprising at least one non-transitory computer-readable storage medium storing software instructions that, when executed, cause an apparatus to:
  obtain identity information, wherein the identity information comprises a plurality of identities within the plurality of virtual spaces and wherein at least one of the identities is a first self-reported identity;
  generate a foundational identity comprising the first self-reported identity, wherein the first self-reported identity may be automatically chosen from a plurality of self-reported identities;
  generate a foundational identity identifier comprising at least one of:
    (i) a string comprising numbers, letters, and symbols,
    (ii) a set of biometric data corresponding to a user associated with the foundational identity,
    (iii) a non-fungible token, and
    (iv) an image;
  link the plurality of identities to the foundational identity such that identities in the plurality of virtual spaces are associated to one another through the foundational identity identifier, wherein, prior to the linking, the identities lack linking information that associates the identities to one another, wherein linking the plurality of identities comprises, for each identity in the plurality of identities;
    recording the identity,
    creating association data associating the foundational identity to the identity, and
    storing the association data together with a representation of the identity;
  verify identity activity associated with the plurality of identities using links between each of the plurality of identities and the foundational identity; and
  generate an output specifying a result of a verification of the identity activity.

18. The computer program product of claim 17, wherein verifying the identity activity comprises:
  obtaining a first request to verify the first identity activity associated with a second identity among the plurality of identities;
  determining that the second identity is associated with the foundational identity; and
  in response to determining that the second identity is associated to the foundational identity, allowing execution of the first identity activity.

19. The computer program product of claim 18, wherein the second identity is directly associated with the foundational identity.

20. The computer program product of claim 18, wherein the second identity is indirectly associated with the foundational identity through a third identity among the plurality of identities.

* * * * *